United States Patent
Ciocirlan et al.

(10) Patent No.: US 8,919,177 B2
(45) Date of Patent: Dec. 30, 2014

(54) MOVABLE DIE COMPONENT FOR A PRESS DEVICE

(71) Applicant: Tyco Electronics Corporation, Berwyn, PA (US)

(72) Inventors: Bogdan Octav Ciocirlan, Hummelstown, PA (US); Gregory Thomas Pawlikowski, Windsor, PA (US); Chris Edward Whitcomb, Elizabethville, PA (US); Edward Joseph Engasser, Pine Grove, PA (US); Craig Maurice Campbell, Mechanicsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/800,953

(22) Filed: Mar. 13, 2013

(65) Prior Publication Data

US 2014/0260506 A1   Sep. 18, 2014

(51) Int. Cl.
*B21D 5/02* (2006.01)
*B21D 13/02* (2006.01)
*B30B 15/02* (2006.01)

(52) U.S. Cl.
CPC .................................. *B30B 15/02* (2013.01)
USPC .............................. 72/455; 72/353.2; 72/413

(58) Field of Classification Search
CPC .................................................. B30B 15/02
USPC ........ 72/348, 350, 351, 354, 379.2, 413, 446, 72/455, 456, 353.2, 354.2
See application file for complete search history.

(56) References Cited

U.S. PATENT DOCUMENTS

| | | | | |
|---|---|---|---|---|
| 3,197,996 A | * | 8/1965 | Zeder, Jr. | 72/348 |
| 3,703,093 A | * | 11/1972 | Komatsu et al. | 72/342.4 |
| 4,096,729 A | * | 6/1978 | Dupler | 72/350 |
| 4,254,999 A | * | 3/1981 | Davidson | 384/42 |
| 4,615,204 A | * | 10/1986 | Yamamoto et al. | 72/347 |
| 5,184,496 A | * | 2/1993 | Namba et al. | 72/350 |
| 5,354,414 A | | 10/1994 | Feygin | |
| 5,600,991 A | * | 2/1997 | Munzen | 72/348 |
| 6,305,202 B1 | * | 10/2001 | Kleber | 72/57 |

(Continued)

FOREIGN PATENT DOCUMENTS

| | | |
|---|---|---|
| DE | 296 10 952 U1 | 9/1996 |
| WO | 2008/146698 A1 | 12/2008 |
| WO | 2012/084688 A1 | 6/2012 |
| WO | 2012/160811 A1 | 11/2012 |

OTHER PUBLICATIONS

International Search Report, International Application No. PCT/US2012020560, International Filing Date, Mar. 5, 2014.

*Primary Examiner* — David B Jones

(57) ABSTRACT

A movable die component for a press device includes a plate body having a workpiece engagement surface configured to engage a workpiece formed by the press device. The plate body has a plurality of internal pockets completely enclosed by the plate body. Optionally, the plate body may be formed by an additive manufacturing process, such as by forming a plurality of direct metal laser sintering layers. The direct metal laser sintering layers may include a lower layer, a plurality of middle layers, and an upper layer with the internal pockets being provided in the middle layers, and with the lower layer covering a bottom of each internal pocket and the upper layer coving a top of each internal pocket.

16 Claims, 5 Drawing Sheets

(56) References Cited

U.S. PATENT DOCUMENTS

| | | | |
|---|---|---|---|
| 7,194,887 B2 * | 3/2007 | Aubry et al. | 72/455 |
| 7,823,430 B2 * | 11/2010 | Hammar et al. | 72/57 |
| 7,980,112 B2 * | 7/2011 | Boersma | 72/482.91 |
| 8,661,870 B1 * | 3/2014 | Ade | 72/476 |
| 2004/0231398 A1 * | 11/2004 | Bliss | 72/481.1 |
| 2007/0283786 A1 | 12/2007 | Kappmeyer | |
| 2012/0308781 A1 | 12/2012 | Abe et al. | |

* cited by examiner

MOVABLE DIE COMPONENT FOR A PRESS DEVICE

BACKGROUND OF THE INVENTION

The subject matter herein relates generally to movable die components for press devices.

A press device includes die components used to form a work piece, such as a base assembly, a stripper plate and a punch assembly movable by a press ram toward the workpiece. The press device is configured for high speed stamping having many cycles per second. The workpiece, which is positioned between the base assembly and punch assembly, is formed during the pressing operation. A stripper plate is positioned between the base assembly and the punch assembly to pin the workpiece against the base assembly as the punch assembly is retracted. The stripper plate is spring actuated away from the base assembly to allow the stripper plate to move.

The spring actuated die components vibrate and rebound when moving and stamping the workpiece. The effects of the vibration and rebound intensifies as the speed of the pressing operation increases leading to accelerated wear and possibly die jams and product quality issues with the components formed from the workpiece. The vibration and rebound momentum of the movable die component is affected by the weight of the object. Heavier die components have more momentum and are affected by vibration and rebound.

A need remains for a press device having reduced vibration and rebound effects on the movable die components during operation of the press device.

BRIEF DESCRIPTION OF THE INVENTION

In one embodiment, a movable die component for a press device is provided that includes a plate body having a workpiece engagement surface configured to engage a workpiece formed by the press device. The plate body has a plurality of internal pockets completely enclosed by the plate body. Optionally, the plate body may be formed by an additive manufacturing process, such as by forming a plurality of direct metal laser sintering layers. The direct metal laser sintering layers may include a lower layer, a plurality of middle layers, and an upper layer with the internal pockets being provided in the middle layers, and with the lower layer covering a bottom of each internal pocket and the upper layer coving a top of each internal pocket.

Optionally, the plate body may include an upper cap and a lower cap covering the internal pockets. The plate body may include support ribs extending between an upper cap and a lower cap. The support ribs may separate the internal pockets from one another. Optionally, damping material may at least partially fill the internal pockets. The damping material may have a lower specific weight than a specific weight of a material of the plate body.

In another embodiment, a press device is provided having a base assembly and a punch assembly movable relative to the base assembly to form a workpiece. The punch assembly presses the workpiece to form the workpiece. The base assembly and the punch assembly include at least one movable die component that includes a plate body having a workpiece engagement surface configured to engage a workpiece formed by the press device. The plate body has a plurality of internal pockets completely enclosed by the plate body.

In another embodiment, a method of manufacturing a movable die component for a press device is provided that includes forming a lower layer by an additive manufacturing process, forming a plurality of middle layers on the lower layer having one or more gaps above the lower layer by an additive manufacturing process, and forming an upper layer on the middle layers by an additive manufacturing process. The upper layer has an upper cap covering the one or more gaps such that the gaps are completely enclosed to form internal pockets in the stripper plate. The layers may be formed by a direct metal laser sintering process or another additive manufacturing process.

DETAILED DESCRIPTION OF THE INVENTION

Figure 1:
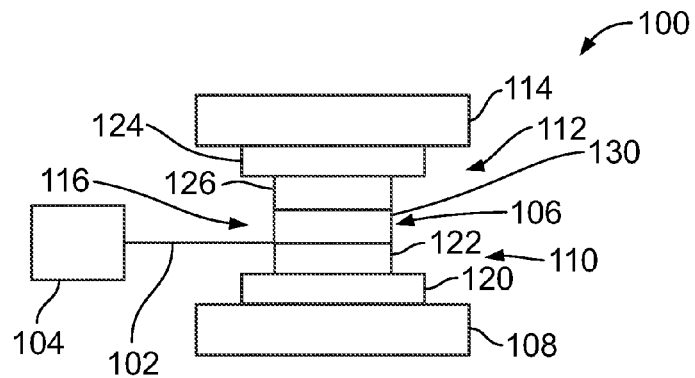
FIG. 1 illustrates a press device formed in accordance with an exemplary embodiment.

FIG. 1 illustrates a press device 100 formed in accordance with an exemplary embodiment. The press device 100 is used to form a workpiece 102 from a metal sheet, such as by punching, stamping, bending or otherwise manipulating the shape and/or profile of the workpiece 102. The press device 100 may be used to form any type of component from the workpiece 102, such as terminals or contacts. The press device 100 may include a feed mechanism 104 used to feed the workpiece 102 to a work zone 106. The press device 100 may include a frame or press bed 108 that supports other components of the press device 100.

A base assembly 110 is supported on the press bed 108. The base assembly 110 supports the workpiece 102 from below during the pressing operation. The press device 100 includes a punch assembly 112 above the base assembly 110. The punch assembly 112 is driven by a press ram 114 during a press operation toward and/or away from the base assembly 110 to press the workpiece 102 to form the component. Optionally, the punch assembly 112 may be spring biased away from the base assembly 110 rather than being pulled away by the press ram 114. In an exemplary embodiment, both the base assembly 110 and the punch assembly 112 include movable die components, generally shown at 116, that are used to form the workpiece 102.

In an exemplary embodiment, the base assembly 110 includes a base shoe 120 supported by the press bed 108 and a base block 122 mounted to the base shoe 120. Optionally, the base block 122 may have a predefined profile for forming a certain type of component from the workpiece 102. The base block 122 may be replaced by a different base block having a different profile to change the type of component manufactured by the press device 100. In an exemplary embodiment, the base block 122 is a movable die component 116. The base block 122 may be cam driven, spring driven or movable by other means. Optionally, the base shoe 120 may be a movable die component 116.

In an exemplary embodiment, the punch assembly 112 includes a punch shoe 124 and a punch block 126 coupled to the punch shoe 124. The punch shoe 124 has a predefined profile to form a certain type of component from the workpiece 102. The punch block 126 may be replaced by a different punch block having a different profile to form a different type of component from the workpiece 102. In an exemplary embodiment, the punch block 126 and the punch shoe 124 are movable die components 116. The punch block 126 and/or the punch shoe 124 may be cam driven, spring driven or movable by other means.

During operation, the workpiece 102 is formed between the base block 122 and the punch block 126. The punch shoe 124 is engaged by the press ram 114 and is driven toward the base assembly 110 during the pressing operation of the press device 100. The die components 116 may be subjected to many pressing cycles per second. The die components 116 may rebound and vibrate as the die components 116 are used. Other types of die components 116 may be used in alternative embodiments.

In an exemplary embodiment, the base assembly 110 includes a stripper plate 130 between the base block 122 and the punch assembly 112. The stripper plate 130 is a movable die component 116. The stripper plate 130 is located between the base block 122 and the punch block 126. The workpiece 102 is feed between the stripper plate 130 and the base block 122. The stripper plate 130 pins the workpiece 102 in position during the pressing operation. The stripper plate 130 is positioned to engage the workpiece 102 during withdrawal of the punch block 126 to prevent distortion of the component and or workpiece 102 and/or to release the workpiece 102 from the punch block 126. The stripper plate 130 pins the workpiece 102 against the base block 122 to strip the workpiece 102 from the punch assembly 112. During operation, the stripper plate 130, in addition to the other components of the press device 100, are subjected to many pressing operations per second. The vibration causes much wear and tear on the components.

In an exemplary embodiment, the movable die components 116 have weight reducing features to reduce wear and tear on the die components 116. For example, material of the die component(s) 116 is removed to reduce the weight of the die component(s) 116. The die component(s) 116 includes internal pockets (shown in FIG. 7) in areas that do not require as much mechanical strength or stability to reduce the overall weight. Vibration and rebound effects are reduced.

Figure 2:
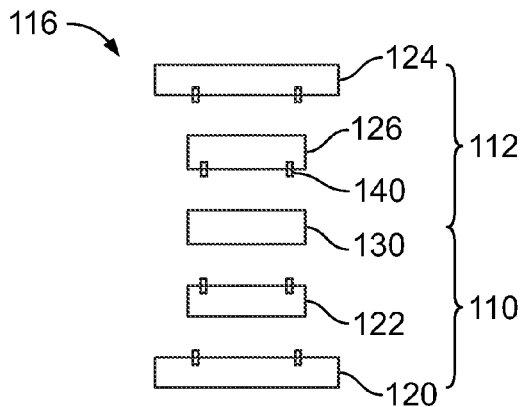
FIG. 2 is an exploded view of a portion of the press device showing a base assembly, punch assembly and stripper plate.

FIG. 2 is an exploded view of a portion of the press device 100 showing the base assembly 110, punch assembly 112 and stripper plate 130. The press device 100 includes biasing elements 140 that are used to press the die components 116 away from each other. For example, the biasing elements 140 may include springs. Force from the press ram 114 (shown in FIG. 1) may overcome the spring forces of the biasing elements 140 during the pressing operation to press the die components 116 together. Once the pressing forces are removed, the biasing elements 140 again press the components apart. Such movement of the die components 116 causes rebound and vibration, which may be mitigated by reducing the weight of the die components 116.

Figure 3:
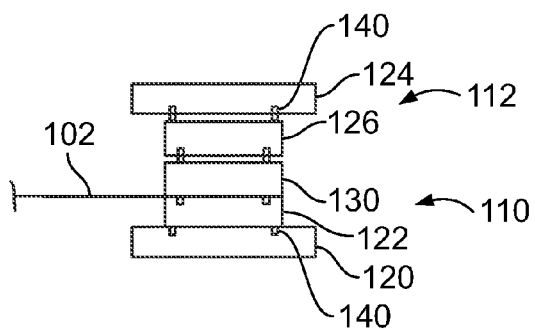
FIG. 3 illustrates a portion of the press device in a fully open position.
Figure 4:
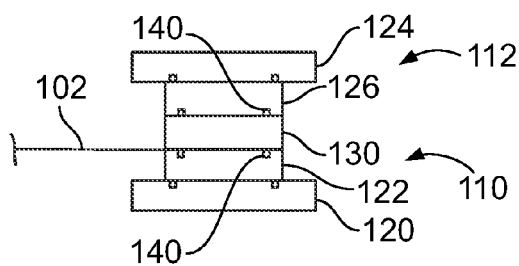
FIG. 4 illustrates a portion of the press device in a fully closed position.

FIG. 3 illustrates a portion of the press device 100 showing the base assembly 110, punch assembly 112 and stripper plate 130 assembled and in a fully open position. FIG. 4 illustrates a portion of the press device 100 showing the base assembly 110, punch assembly 112 and stripper plate 130 assembled and in a fully closed position. In operation, the press ram 114 (shown in FIG. 1) applies a pressing force 154 against the punch shoe 124 to drive the punch shoe 124 and punch block 126 downward toward the striper plate 130 and base assembly 110. The workpiece 102, which is positioned between the base assembly 110 and punch assembly 112 is pressed and formed during the pressing operation. When the pressing force 154 of the press ram 114 is released, the punch assembly 112 is forced away from the base assembly 110. The stripper plate 130 holds the workpiece 102 against the base block 122 as the punch assembly 112 is retracted. The biasing elements 140 operate to press the die components 116 away from one another when the pressing force 154 of the press ram 114 is removed or unloaded from the punch shoe 124 allowing some separation between the base assembly 110 and punch assembly 112 to allow the workpiece 102 to advance for the next pressing operation. The press device 100 may be configured for high speed stamping having many cycles per second.

Figure 5:
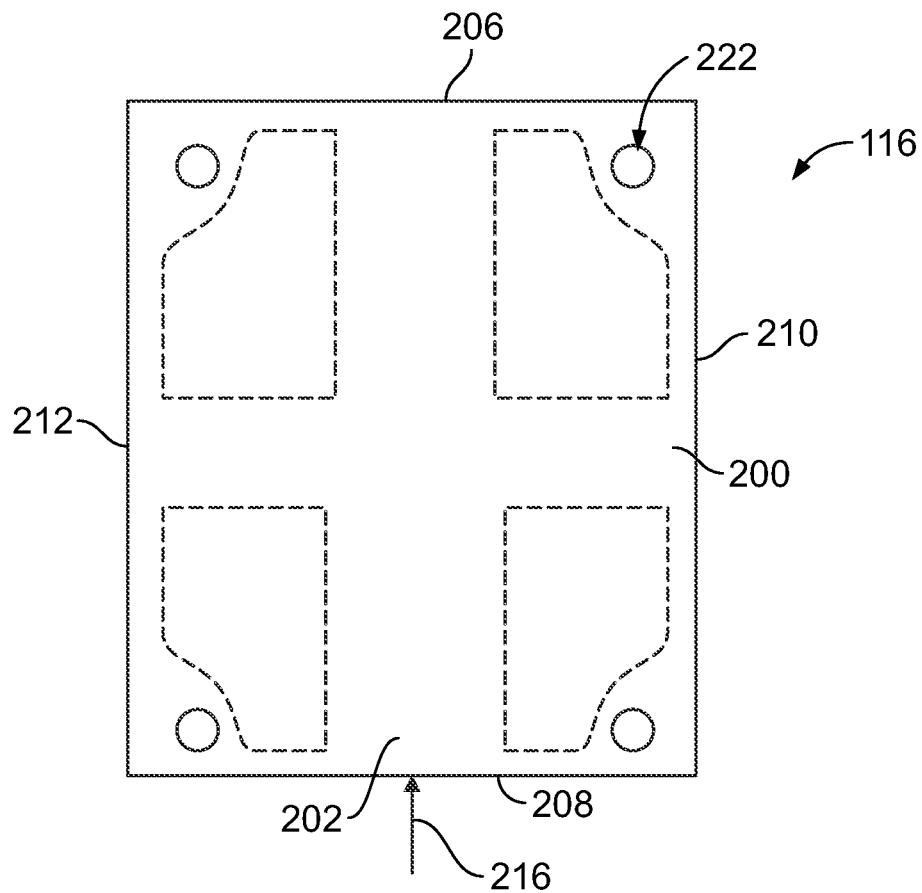
FIG. 5 is a top view of a movable die component of the press device.
Figure 6:
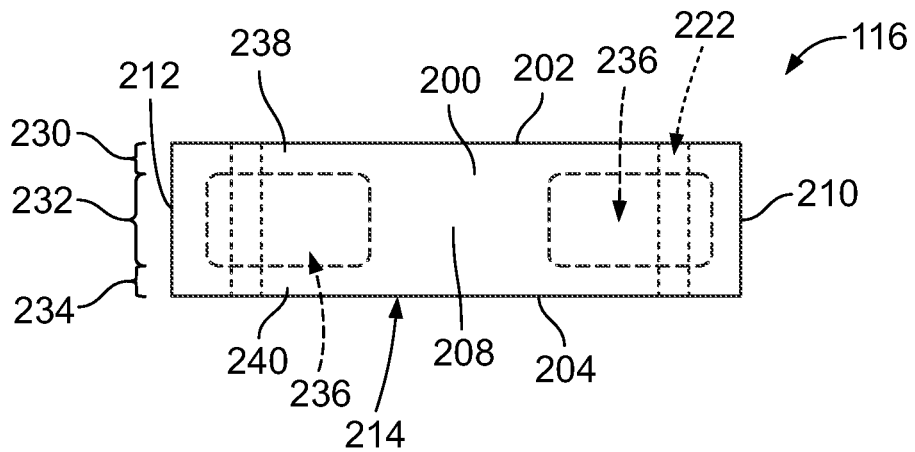
FIG. 6 is a side view of the movable die component.
Figure 7:
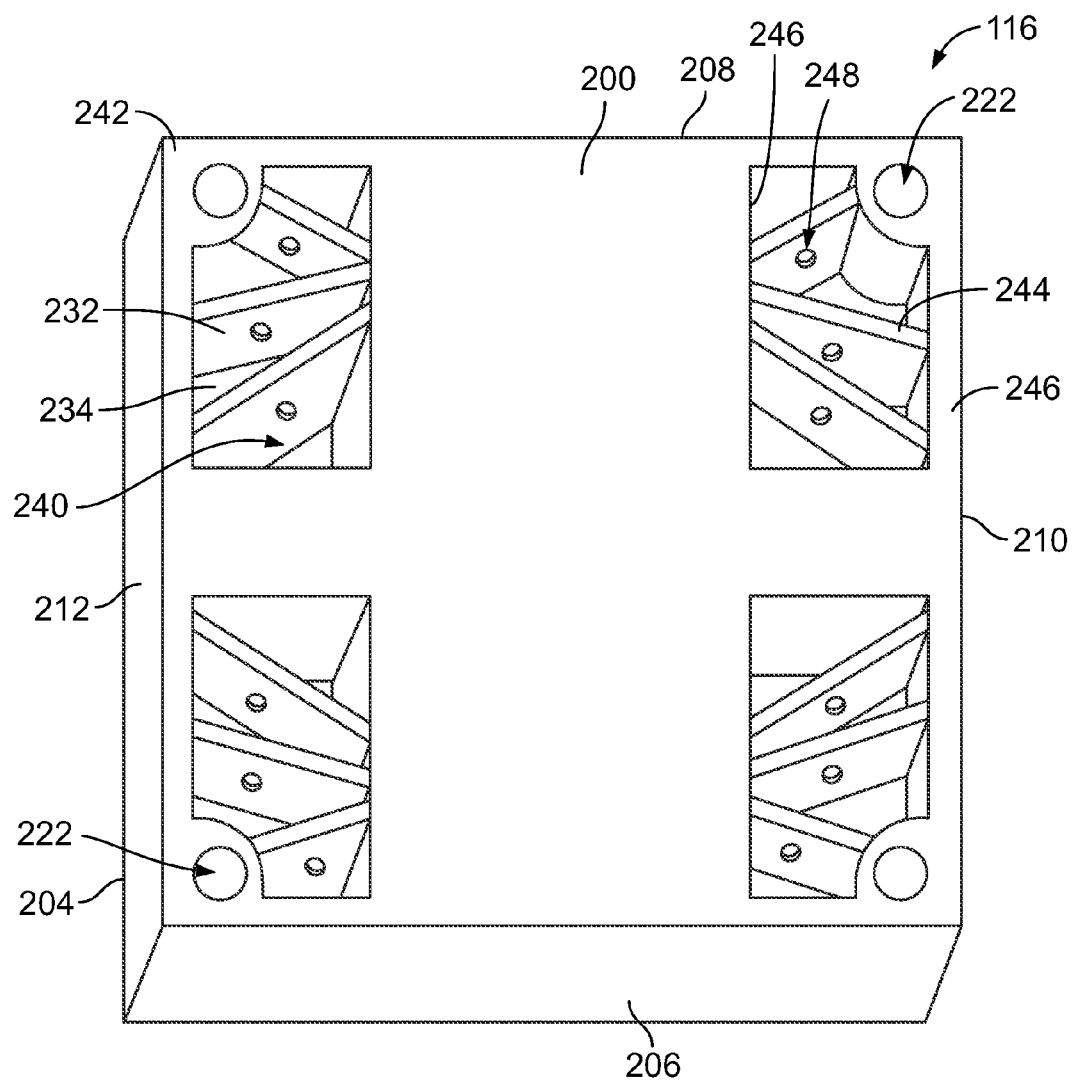
FIG. 7 is a partial sectional view of a portion of the movable die component.

FIG. 5 is a top view of a movable die component 116. FIG. 6 is a side view of the movable die component 116. FIG. 7 is a partial sectional view of the movable die component 116. The weight reducing features, such as the internal pockets, are shown in FIG. 7.

The die component 116 includes a plate body 200 extending between a top 202, a bottom 204, a front edge 206, a rear edge 208, a first side 210 and a second side 212. The die component 116 includes at least one workpiece engagement surface 214 configured to engage the workpiece 102. In an exemplary embodiment, the workpiece engagement surface 214 is defined by either the top 202 or the bottom 204. The workpiece engagement surface 214 may be used to form the workpiece 102 or may be used to hold the workpiece 102. For example, the die block 122 (shown in FIG. 1) may have a workpiece engagement surface 214 on the top of the die block 122 that is used to form the workpiece 102 during the pressing operation; the punch block 126 (shown in FIG. 1) may have a workpiece engagement surface 214 on the bottom of the punch block 126 that is used to form the workpiece 102 during the pressing operation; and the stripper plate 130 (shown in FIG. 1) may have a workpiece engagement surface 214 on the bottom of the stripper plate 130 that is used to hold and pin the workpiece 102 against the die block 122 as the punch block 126 is withdrawn. Optionally, the workpiece 102 may be fed in a feed direction 216 generally from the front edge 206 toward the rear edge 208. In the illustrated embodiment, the weight reducing features are completely enclosed by the plate body 200 and thus are shown in phantom in FIGS. 5-6.

The plate body 200 may have any size or shape depending on the particular application. In an exemplary embodiment, the thinnest dimension of the plate body 200 is the height of the plate body 200 measured between the top 202 and the bottom 204. In an exemplary embodiment, the top 202 and bottom 204 are generally planer and parallel to one another. The top and bottom 202, 204 may include slots, grooves, channels, indentations, projections, tabs and the like that are used to form the workpiece 102, align the die component 116 with another component, guide movement of the die component 116, and the like.

In an exemplary embodiment, the plate body 200 may include one or more cavities that hold inserts (not shown) therein. The inserts may include features used to form the workpiece 102. The inserts may be removable and replaceable, such as when the inserts are worn or to change the shape of the forming surface for the workpiece 102.

In an exemplary embodiment, the plate body 200 includes openings 222. In the illustrated embodiment, the openings 222 are provided at the sides 210, 212 near the front and rear edges 206, 208, however the openings 222 may be positioned at other locations in alternative embodiments. The openings 222 extend entirely through the plate body 200. Guide posts, fasteners or other components may be loaded into and/or through the openings 222, such as to tie the die component 116 to another component.

In an exemplary embodiment, the plate body 200 is a layered structure having one or more upper layers 230, one or more middle layers 232 and one or more lower layers 234. Internal pockets 236 (shown in FIG. 7) are provided in the middle layers 232. The upper and lower layers 230, 234 cover the internal pockets 236. The upper layer 230 includes upper caps 238 covering the internal pockets 236. The lower layer 234 includes lower caps 240 covering the internal pockets 236. The upper and lower caps 238, 240 may be integral with the upper and lower layers 230, 234, respectively. Optionally, the internal pockets 236 may be at least partially filled with damping material having a lower specific weight than a specific weight of the metal powder material used to form the lower layer, middle layers and upper layer.

In an exemplary embodiment, the plate body 200 is manufactured by an additive manufacturing process. For example, the plate body 200 may be manufactured using a direct metal laser sintering process where the layers of the layered structure are built up by an additive process using a laser to form the layers from metal powder. The plate body 200 may be formed by other additive manufacturing processes, such as using an electron beam forming process. The plate body 200 is thus manufactured into a unitary body where the upper layers 230, the middle layers 232 and the lower layers 234 are all integrally formed and indivisible. The internal pockets 236 are provided and formed during the build-up process in predetermined areas of the plate body 200, as opposed to a subtractive process where portions of a metal block are milled or grinded out to form internal pockets.

In an alternative embodiment, the plate body 200 may be formed from separate pieces, such as an upper piece, a middle piece and a lower piece that are fastened or otherwise affixed together to form the plate body 200. The middle piece includes the internal pockets 236 and the upper and lower pieces act as caps or covers to cover the internal pockets 236. The separate pieces are not formed together but rather are later assembled together to form the plate body. The different pieces may be formed by any method, including an additive process to build up layers to form the individual piece. The internal pockets 236 may be formed during the build-up process. Alternatively, the pieces may be formed by a subtractive process, such as where a block or material is milled, grinded, drilled or otherwise subjected to a process that removes material, such as to form the internal pockets 236.

In an exemplary embodiment, the internal pockets 236 are completely enclosed by the plate body 200. The internal pockets 236 reduce the overall weight of the die component 116 by removing material of the plate body 200 in areas of the plate body 200 that do not require as much mechanical strength and stability. For example, the internal pockets 236 may be positioned near corners 242 of the plate body 200. The internal pockets 236 may be positioned away from the areas of the plate body 200 that engage the workpiece 102 and are used to form the workpiece 102.

Reducing the weight of the plate body 200 reduces the dynamic effect of the rebound of the die component 116 during the pressing operation. Optionally, the internal pockets 236 may reduce the overall weigh of the plate body 200 by between approximately 10% and 30%. In an exemplary embodiment, the internal pockets 236 are separated by support ribs 244 that extend vertical through the plate body 200. The internal pockets 236 are bounded by side walls 246. The support ribs 244 extend between the side walls 246 and between the upper and lower caps 238, 240.

Optionally, openings 248 may extend through the support ribs 244 to open adjacent internal pockets 236 to one another. The openings 248 may reduce the overall weigh of the support ribs 244, thus reducing the overall weight of the plate body 200. In the illustrated embodiment, the openings 248 are cylindrical; however the openings 248 may have other shapes in alternative embodiments. Optionally, the support ribs 244 may each include multiple openings 248.

The internal pockets 236 are provided in the middle layers 232 of the plate body 200. The upper and lower layers 230, 234 of the plate body 200 define the caps 238, 240 that cover the internal pockets 236 such that the internal pockets 236 are completely enclosed. The upper and lower layers 230, 234 cover the internal pockets 236 to prevent debris and other contaminates from entering the internal pockets 236.

In an exemplary embodiment, the plate body 200 is manufactured by an additive process, such as a direct metal laser sintering process. During the direct metal laser sintering process, metal powder layers are sequentially built up. Metal powder material is layered on top of the object being formed and a laser is used to melt the powder into a solid. The structure of the solid object can be controlled by controlling the laser. Different layers of the solid object may have different geometry. For example, the lower layer or layers may have a different geometry from the middle layers which may have a different geometry from the upper layer or layers. For example, the middle layers may include gaps in certain areas that when the layers are stacked up form the internal pockets 236. However the upper and lower layers 230, 234 may not include such gaps but rather cover the gaps or internal pockets 236 with the caps 238, 240.

The direct metal laser sintering process is an additive process where the solid object is manufactured by adding layers upon layers to form the solid object. Complex geometries for the layers may be formed by the direct metal laser sintering process. The geometry of the layers may be more complex than a subtractive process such as milling or grinding where the size, shape, and location of the openings through the solid object are limited. Additionally, using the subtractive process such as milling or grinding leaves an exterior opening where debris or other contaminants can enter the opening. In contrast, the die component 116 includes the internal pockets 236, which are closed off at the top, bottom and along the sides of the internal pockets 236 such that the internal pockets 236 are completely enclosed.

Figure 8:
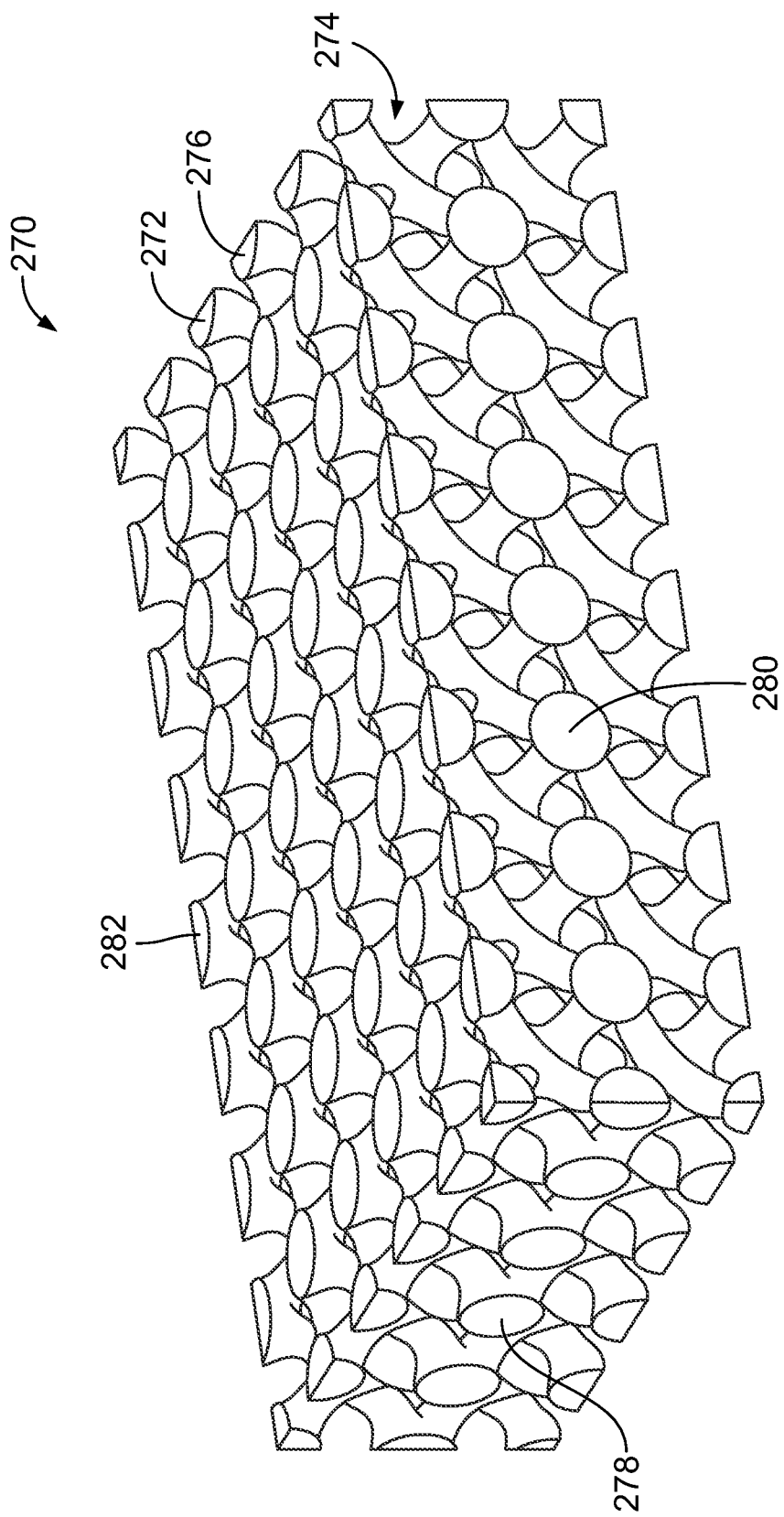
FIG. 8 illustrates another movable die component.

FIG. 8 is a perspective view of another movable die component 270. The movable die component 270 has a plate body 272 having internal pockets (not shown) similar to the internal pockets 236 (shown in FIG. 7) and external pockets 274 in addition to the internal pockets. The external pockets 274 are open to the exterior of the plate body 272, such as along front and rear edges 276, 278 and/or sides 280, 282. The external pockets 274 help to further reduce the weight of the plate body 272.

Figure 9:
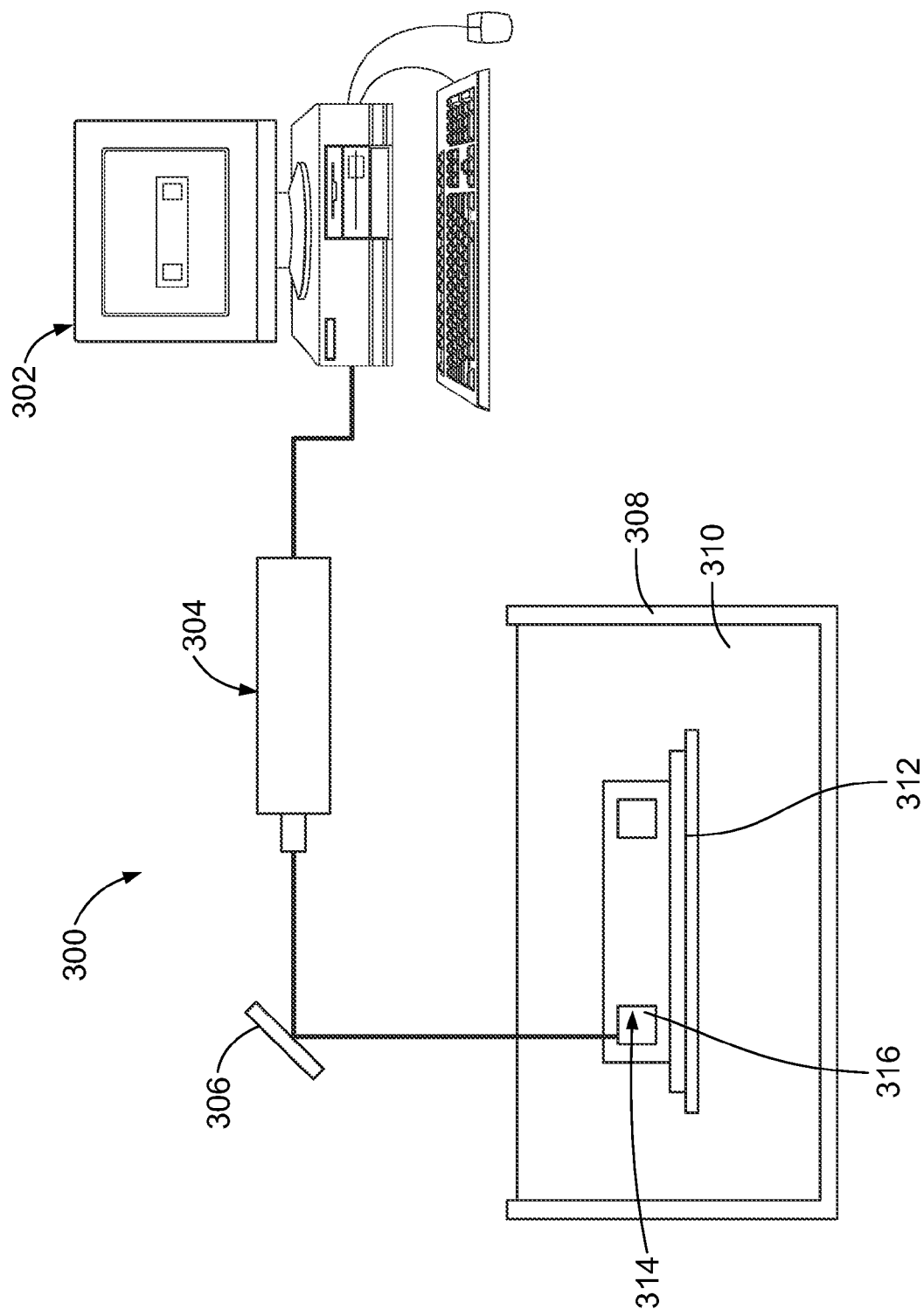
FIG. 9 illustrates a machine used to manufacture the stripper plate.

FIG. 9 illustrates an exemplary machine 300 used to manufacture the die component 116. The machine 300 includes a computer 302, a laser 304 operatively coupled to the computer 302, a mirror system 306 for directing a laser beam from the laser 304 and a bath 308 holding powder material 310 used to form the die component 116 on a platform 312. The laser 304 is operated to build-up layers of the die component 116. The laser sinters the material 310 to solidify the material in a predetermined form.

In an exemplary embodiment, the machine 300 forms a lower layer by direct metal laser sintering the metal powder material 310. The machine 300 forms a plurality of middle layers on the lower layer by direct metal laser sintering the metal powder material 310, where the middle layers having one or more gaps 314 above the lower layer. The machine 300 forms an upper layer on the middle layers by direct metal laser sintering the metal powder material 310 on the middle layers. The upper layer has an upper cap covering the one or more gaps 314 such that the gaps 314 are completely enclosed to form the internal pockets 236 (shown in FIG. 8) in the die component 116. The machine 300 may form support ribs 316 between corresponding gaps 314 that separating the internal pockets from one another. The support ribs 316 may extend between the upper cap and corresponding lower cap of the lower layer defined below the internal pockets. Optionally, the gaps 314 may be at least partially filled with damping material having a lower specific weight than a specific weight of the metal powder material used to form the lower layer, middle layers and upper layer. Other types of machines or machines having other components may be used to form the die component 116 by a direct metal laser sintering process or by another additive process.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A movable die component for a press device, the die component comprising:
   a plate body having a workpiece engagement surface configured to engage a workpiece formed by the press device, the plate body having a plurality of internal pockets completely enclosed by the plate body, the plate body being formed by a plurality of layers built-up on each other and being integral to form a unitary plate body, wherein the layers comprise a lower layer, a plurality of middle layers, and an upper layer, the internal pockets being provided in the middle layers, the lower layer covering a bottom of each internal pocket, the upper layer covering a top of each internal pocket.

2. The movable die component of claim 1, wherein the plate body includes an upper cap and a lower cap covering the internal pockets.

3. The movable die component of claim 1, wherein the plate body includes support ribs extending between an upper cap and a lower cap, the support ribs separating the internal pockets from one another, the upper cap and the lower cap covering the internal pockets.

4. The movable die component of claim 1, further comprising damping material at least partially filling the internal pockets, the damping material having a lower specific weight than a specific weight of a material of the plate body.

5. The movable die component of claim 1, wherein the plate body is formed by a plurality of direct metal laser sintering layers comprising the lower layer, the plurality of middle layers, and the upper layer.

6. A press device comprising:
   a base assembly having at least one movable die component configured to form a workpiece; and
   a punch assembly movable relative to the base assembly, the punch assembly having at least one movable die component pressing the workpiece to form the workpiece;
   wherein at least one of the movable die components comprises a plate body having a workpiece engagement surface configured to engage the workpiece formed by the base assembly and the punch assembly, the plate body having a plurality of internal pockets completely enclosed by the plate body, the plate body being formed by a plurality of direct metal laser sintering layers comprising a lower layer, a plurality of middle layers, and an upper layer, the internal pockets being provided in the middle layers, the lower layer covering a bottom of each internal pocket, the upper layer covering a top of each internal pocket.

7. The press device of claim 6, wherein the base assembly comprises a base block defining a movable die component, the punch assembly comprising a punch block defining a movable die component, the punch block being driven by a press ram toward the base block to form the workpiece between the punch block and the base block.

8. The press device of claim 6, wherein the punch assembly comprises a punch block defining a movable die component, the base assembly comprises a base block defining a movable die component and a stripper plate defining a movable die component, the stripper plate being positioned between the base block and the punch block, the stripper plate pinning the workpiece against the base block.

9. The press device of claim 6, wherein the plate body includes an upper cap and a lower cap covering the internal pockets.

10. The press device of claim 6, wherein the plate body includes support ribs extending between an upper cap and a lower cap, the support ribs separating the internal pockets from one another, the upper cap and the lower cap covering the internal pockets.

11. The press device of claim 6, wherein the plate body is formed by a plurality of layers built-up on each other and being integral to form a unitary plate body.

12. The press device of claim 6, further comprising damping material at least partially filling the internal pockets, the damping material having a lower specific weight than a specific weight of a material of the plate body.

13. A method of manufacturing a movable die component for a press device, the method comprising;
   forming a lower layer by an additive manufacturing process;
   forming a plurality of middle layers on the lower layer by an additive manufacturing process, the middle layers having one or more gaps above the lower layer; and forming an upper layer on the middle layers by an additive manufacturing process, the upper layer having an upper cap covering the one or more gaps such that the gaps are completely enclosed to form internal pockets in the movable die component.

14. The method of claim 13, wherein said forming a plurality of middle layers comprises forming support ribs between corresponding gaps, the support ribs separating the internal pockets from one another, the support ribs extending between the upper cap and a corresponding lower cap of the lower layer defined below the internal pockets.

15. The method of claim 13, further comprising at least partially filling the gaps with damping material having a lower specific weight than a specific weight of the metal powder material used to form the lower layer, middle layers and upper layer.

16. The method of claim 13, wherein said forming a lower layer, forming a plurality of middle layers and forming an upper layer comprises direct metal laser sintering a metal powder material.

* * * * *